United States Patent [19]

Bosek

[11] Patent Number: 4,797,039
[45] Date of Patent: Jan. 10, 1989

[54] CUTTING TOOL BIT SUPPORT

[75] Inventor: Ronald P. Bosek, Davisburg, Mich.

[73] Assignee: GTE Valenite Corporation, Troy, Mich.

[21] Appl. No.: 102,063

[22] Filed: Sep. 23, 1987

[51] Int. Cl.⁴ .............................. B23P 15/28
[52] U.S. Cl. ........................ 407/87; 407/76; 407/88; 407/101; 407/108; 407/112; 407/41; 407/45; 407/46; 407/49
[58] Field of Search ............. 407/80, 85, 86, 87, 407/88, 94, 108, 37, 45, 76, 73, 74, 75, 101, 102, 107, 112, 36, 40, 41, 44, 46, 47, 49

[56] References Cited

U.S. PATENT DOCUMENTS

| | | | |
|---|---|---|---|
| 2,645,844 | 7/1953 | Lowge | 407/87 |
| 3,270,396 | 9/1966 | Williams | 407/45 |
| 3,882,582 | 5/1975 | Williams | 407/37 |
| 4,305,440 | 12/1981 | Lacasse | 407/45 |
| 4,318,647 | 3/1982 | Erkfritz | 407/45 |

Primary Examiner—Frederick P. Schmidt
Assistant Examiner—Blynn Shideler
Attorney, Agent, or Firm—David J. Koris

[57] ABSTRACT

Adjustable cutting tool bit support, usable as in a stump cutter body, including adjustable jack for variable registration depth of cutting bit, a differential screw engaging differential threads in the body and jack for adjusting the jack position, a wedge clamp for locking engagement of the body and tool bit in adjusted position and a differential screw engaging differential threads in the respective wedge clamp and jack for positively moving said wedge clamp into an effective clamping engagement.

11 Claims, 2 Drawing Sheets

CUTTING TOOL BIT SUPPORT

BACKGROUND OF THE INVENTION

An adjustable rotary insert bit tool holder is known in the art as disclosed in U.S. Pat. No. 3,882,582, having a peripheral recess in which the bit is clamped with a wedge and a lock screw directed inwardly of the recess forcing the wedge frictionally against one side of the recess. A lifting jack engages under the bit and is adjusted outwardly of the recess by a screw threaded through the jack and against the bottom of the recess.

Another relevant prior art adjustable insert seat and wedge assembly is disclosed in U. S. Pat. No. 4,318,647. In such disclosure, a boring cutter which is adapted to be rotated about its central axis includes at least one insert pocket having opposed parallel leading and trailing walls, as well as a bottom wall. An insert seat of generally L-shaped configuration is provided, with the leading surface of the insert seat being in abutting relationship with the leading wall of the pocket. The opposed trailing surface of the insert seat includes both a leading and rear locating support surface adapted to receive an indexable cutting insert. A wedge is receivable between the rear surface of the cutting insert and the trailing wall of the pocket. The radial position of both the insert seat and the wedge, relative to the central axis of the boring cutter is adjustable. By this arrangement, the radial position of the cutting insert may be varied to thereby adjust the effective outer diameter of the boring cutter. In addition, the amount of overhang, or the difference in the radial position between the cutting insert and the wedge, remains constant thereby maintaining the structural support for the cutting edge of the insert

BRIEF DESCRIPTION OF THE INVENTION

In a cutting tool bit support designed particularly for multiple perimeter installation on rotary stump cutter bodies, a jack is employed for adjusting the extension of the tool bit projection from the body, and a wedge clamp is employed reacting against the body for holding the tool bit in adjusted position. A differential screw having oppositely threaded ends respectively engaging threaded apertures in the body and jack is employed to effect adjustable displacement of the jack and cutting bit projection, and a second differential screw with oppositely threaded ends, engaging respectively the wedge clamp and the jack, locks the wedge clamp in retaining engagement and upon reverse rotation provides positive unlocking withdrawal of the wedge clamp.

DETAILED DESCRIPTION OF PREFERRED EMBODIMENT

Figure 1:
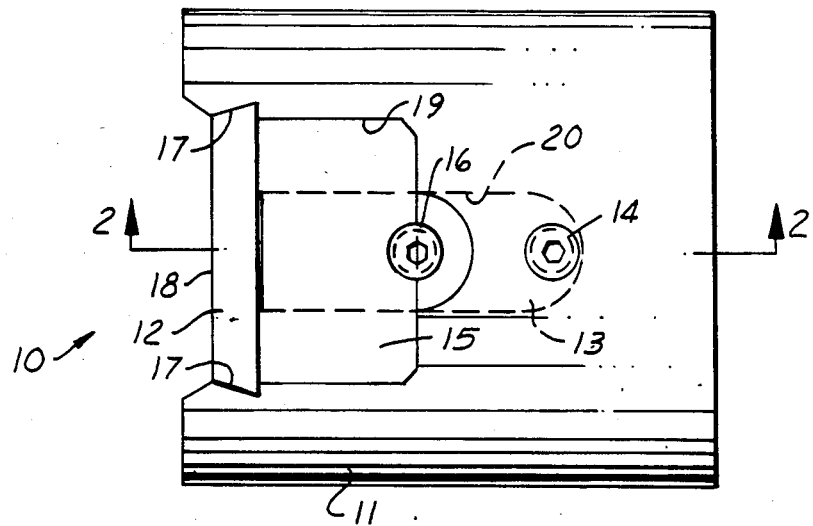
FIG. 1 is a top view of a cutting bit pocket constructed in accordance with the present invention.

Tool bit pocket 10 comprising body 11, blade tool bit 12, jack 13, differential jack screw 14, wedge 15, and differential wedge screw 16 is typically employed in multiple circumferentially spaced units of stump cutter bodies wherein a blade form of each cutter bit 12 accommodates resharpening either with tool bit blades removed or retained in adjusted projecting position in the cutter body.

Tapered shoulders 17 provide reaction mounting surfaces for side edges of tool bit 12 leaving face 18 of each positive rake cutting bit generally exposed for guiding chip flow.

Wedge pocket 19 accommodates clamping wedge 15 extending substantially to the extremities of tool bit 12 while a narrower recess 20 accommodates correspondingly narrow jack 13.

Figure 2:
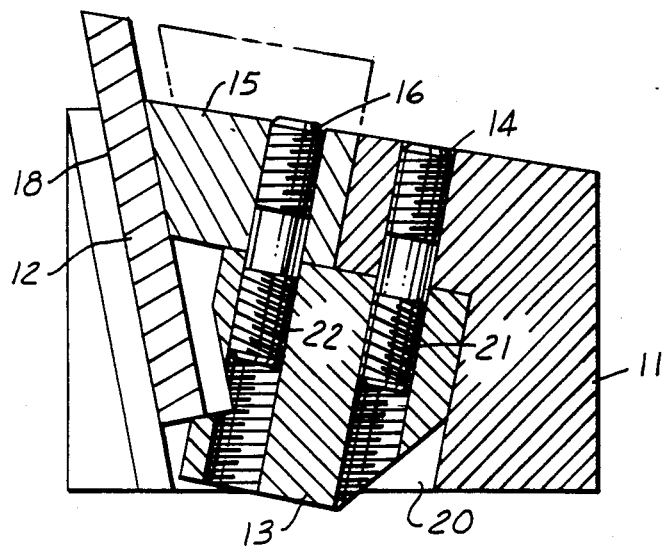
FIG. 2 is a sectional view taken along the line 2—2 of FIG. 1 illustrating one extremity of adjustment.
Figure 3:
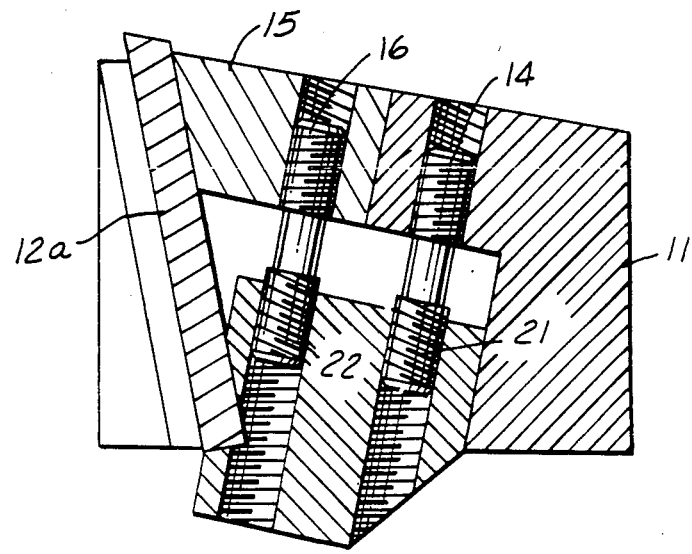
FIG. 3 is a sectional view corresponding to FIG. 2 illustrating the other extremity of adjustment.

Each of ends 21 and 22 of respective differential screws 14 and 16 is provided with a right-hand thread while each opposite end is provided with a left-hand thread to effect adjustment and clamping within the range illustrated by FIGS. 2 and 3. Initial positioning of jack 13 at one extremity corresponding to a new blade 12a will be accomplished by differential screw 14 with differential screw 16 holding wedge clamp 15 in a loose condition whereupon tightening of differential screw 16 will draw wedge 15 into clamping engagement. To achieve release of tool bit 12a and upward adjustment of jack 13, differential screw 16 is first actuated to positively free the clamping action whereupon differential screw 14 is actuated to raise jack 13 to a required position. In so doing, wedge clamp 15 will also be raised a corresponding amount requiring an initial corresponding return feed by differential screw 16 in addition to tightening for clamping action.

It will be noted that a full adjustment feed to the extremity illustrated in FIG. 2 may be accomplished without complete removal of either differential screw from the engaged element shown so that a convenient and rapidly executed loosening, adjustment and retightening of clamp 15 may be readily achieved for each new adjustment of tool bit 12. By employing jack 13 as the reaction element for differential screw 16 tightening of wedge clamp 15, there is no need to provide a reaction thread for the wedge clamp tightening screw in the body as required in the '647 disclosure; and a positive feed for loosening adjustment and retightening is provided in contrast to the disclosure of the '582 patent which includes no differential action.

Figure 4:
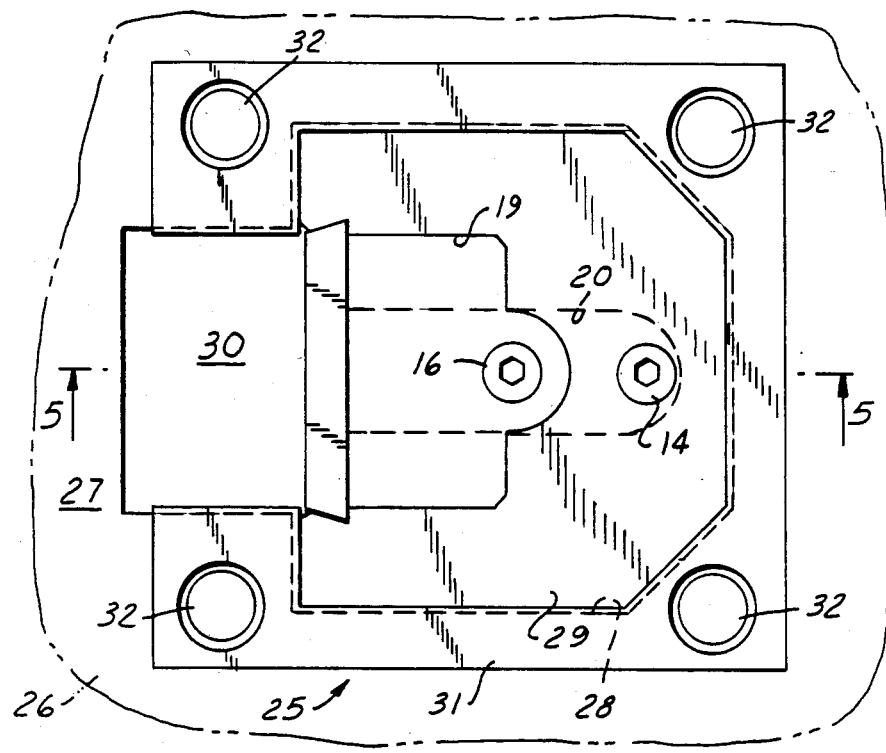
FIG. 4 is a top view of a cartridge employing the cutting bit pocket for installation on a stump chipping cutter disc.
Figure 5:
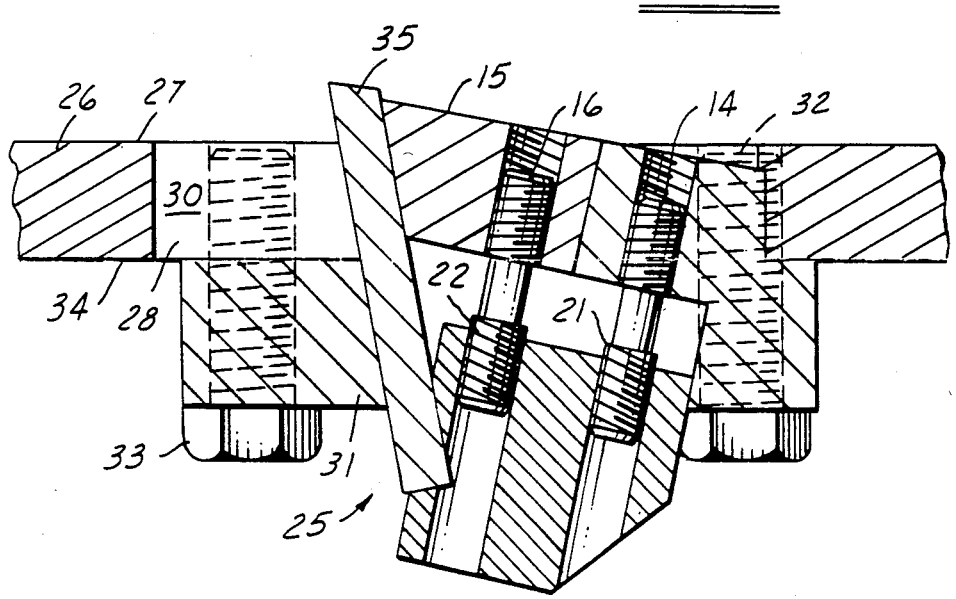
FIG. 5 is a sectional side elevation of the cartridge shown in FIG. 4.

With reference to FIGS. 4 and 5, the adjustable tool bit is provided in cartridge 25 adapted for multiple installation on rotary face cutter disc 26, a large version of which has been developed to harvest tree stumps fed in natural entirety as extracted from the earth by a power ram against the face 27. For each cartridge, a through opening is provided for cartridge head 29 with open clearance 30 for chip flow through the disc.

Cartridge head 29 is provided with mounting perimeter flange 31 having four bolt holes 32 for securing the cartridge with bolts 33 installed against back face 34 of disc 26. Tool bit blade 35 projects from front face 27 of disc 26 a distance equal to chip thickness with exposed face access to the differential screws for loosening, adjusting the projection and retightening blade 35.

The present invention is capable of durably cutting the stumps into usable chip form notwithstanding abrasive sand, dirt and stones adhering to the stump roots as pulled out of the ground. Occasional chipping of the blade does not prevent effective cutting until extensive wear requires adjustment of projection either with or without resharpening.

In a complete assembly, disc 26 is mounted with spacers on a second disc having a rotary drive means which permits installation of successive cartridges on the outer disc at required radial increments. Such general construction has been previously developed and employed commercially and, because outside of the scope of the present improvement, has not been further illustrated.

From the foregoing description, it will be understood that loosening, adjustment and retightening may be accomplished without disengaging either end of cutter differential screws from its threaded engagement with respective body, jack and wedge elements. For metal assembly, screw ends 21 and 22 are first started in jack 13; screw end 14 is next started in body 11 and adjusted to any desired level of blade 12; and wedge 15 is finally positioned on screw end 16 and turned to clamping engagement.

I claim:

1. Cutting tool bit support comprising a body, tool bit mounting reaction surface means and said body accommodating linear tool bit adjustment, said surface means including linear beveled tool bit side engaging reaction surfaces, a tool bit adjustably engaging said beveled side surface means having a projecting cutting edge, a jack recess in said body accommodating linear jack adjustment, a jack engaging said tool bit, a first differential screw means operationally connected between said tool body and said jack to provide linear tool bit adjustment, a wedge clamp having annular surfaces engageable with matching surfaces of said tool bit and said body, and a second differential screw means operationally connected between said wedge clamp and said jack means to provide clamping engagement of said wedge clamp against said tool bit in adjusted position.

2. Cutting tool bit support comprising a body, tool bit tool bit mounting reaction surface means in said body accommodating linear tool bit adjustment, said surface means including linear beveled tool bit side engaging reaction surfaces, a tool bit adjustably engaging said beveled side surface means having a projecting cutting edge, a jack recess in said body accommodating linear jack adjustment, a jack engaging said tool bit, a first differential screw means engaging differential screw threads in said respective body and jack to effect said jack and tool bit projection adjustment, a wedge clamp having angular surfaces engageable with matching surfaces of said tool bit and said body, and a second differential screw means engaging differential screw threads in said respective wedge clamp and and jack to effect clamping engagement of said tool bit in adjusted position.

3. Tool bit support of claim 2 wherein said tool bit blade comprises a generally rectangular form having parallel faces.

4. Tool bit support of claim 3 wherein said jack engages said tool bit at an end opposite its projecting cutting edge.

5. Tool bit support of claim 3 wherein said wedge clamp engages substantially the full width of said tool bit.

6. Tool bit support of claim 5 wherein said jack recess is substantially narrower than said wedge clamp and centrally located relative thereto.

7. Tool bit support of claim 3 wherein said parallel focus of said tool bit includes a positive rake cutting edge with said tool bit parallel faces extending at a wedge angle relative to the respective axes of said first and second differential screw means.

8. Tool bit support of claim 7 including parallel reaction surfaces for said wedge clamp and jack provided in said body which are parallel to the axes of said first and second differential screw means.

9. Tool bit support of claim 8 wherein said first and second differential screws include threads of the same hand engaging said jack screw threads.

10. Tool bit support of claim 9 including a jack engaging end surface of said tool bit extending normal to said parallel faces.

11. Tool bit support of claim 10 including a matching tool bit stop in said jack extending to a depth accommodating full range of adjustment.

* * * * *